INVENTOR
ARTHUR L. WILLIAMS
BY
his ATTORNEYS.

INVENTOR
ARTHUR L. WILLIAMS
BY Steward & Steward
his ATTORNEYS.

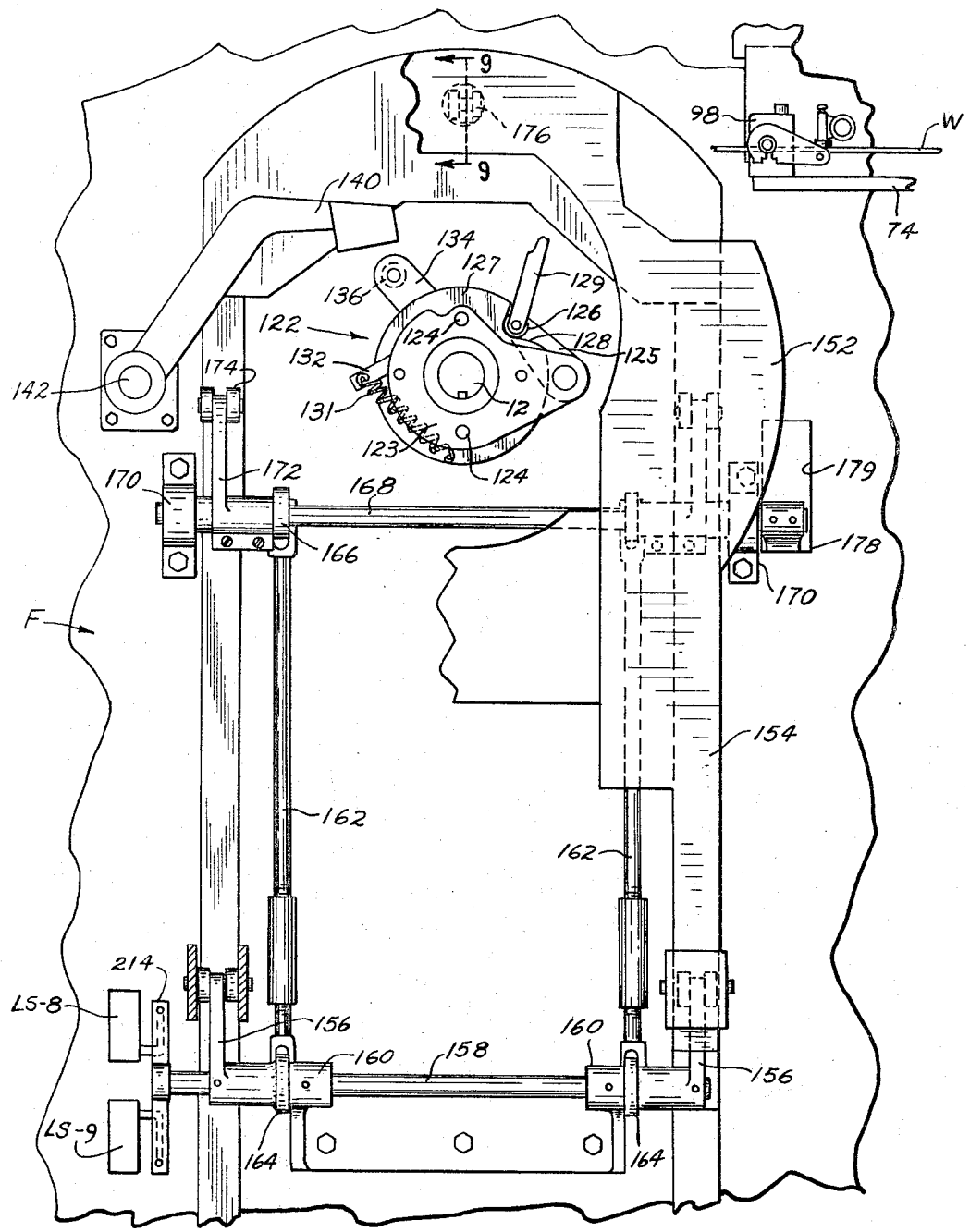
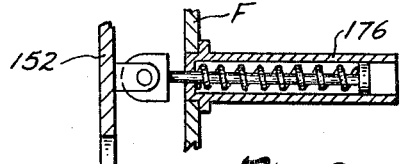
Fig. 8
Fig. 9
INVENTOR
ARTHUR L. WILLIAMS
BY Steward & Steward
his ATTORNEYS.

INVENTOR
ARTHUR L. WILLIAMS
BY Steward + Steward
his ATTORNEYS.

United States Patent Office 3,330,491
Patented July 11, 1967

3,330,491
APPARATUS FOR FORMING BEADS FOR PNEUMATIC TIRES
Arthur L. Williams, Des Moines, Iowa, assignor to The Armstrong Rubber Company, West Haven, Conn., a corporation of Connecticut
Filed Dec. 10, 1965, Ser. No. 512,918
9 Claims. (Cl. 242—7)

This invention relates to apparatus for forming beads for pneumatic tires, and it relates more particularly to machines for automatically producing such beads at high speed.

In the manufacture of pneumatic tires for automobiles, trucks, aircraft and the like, the tire is provided with wire rings adjacent each side of the rim on which the tire is mounted. These wire rings or beads are molded integrally with the tire and provide the strength and rigidity required to hold the tire securely in place on the rim. The beads are formed by winding the previously prepared bead wire onto the periphery of a large wheel, the diameter of which is equivalent to the bead diameter of the tire. This forming wheel for the machine is rotated rapidly for from three to seven revolutions or so, and then brought to a dead stop at exactly the right point in its rotation. This means that terrific strain is placed on the driving and braking means, which must rapidly accelerate and decelerate the forming wheel, so that the machine will produce enough beads to keep up with the bead wire, which is continuously being fed to it from the wire extruder or tuber. Because of the substantial weight of the bead-forming wheels that must be used, considerable trouble has been experienced by tire manufacturers in maintaining and operating bead-forming machines of prior design.

It is a primary object of the present invention to provide a bead-forming machine which can be operated for long periods without major breakdown, and which can be easily maintained or repaired in case of difficulty.

This objective is attained by providing a drive system which comprises a high-speed drive means and a low-speed drive means, each of which may be brought into and out of engagement with the drive shaft for the forming wheel by a separate clutch. The high-speed drive brings the forming wheel rapidly up to speed upon engagement of one of the clutches. At a predetermined point before the forming wheel must be stopped, the high-speed drive is disconnected from the drive shaft by disengaging said first clutch, and the low-speed drive is connected with the drive shaft by engaging the second clutch. The low-speed drive system is provided with means, such as a heavy flywheel, for maintaining its speed, so that engagement of this system with the forming wheel acts as a brake in order to rapidly decelerate the wheel. Electromagnetic clutches have been found to be particularly suitable for engaging and disengaging the two drive systems.

A further feature of the invention involves the use of a mechanical brake for stopping the forming wheel after its speed has been reduced by the low-speed drive system, thus practically eliminating wear and tear on the mechanical brake mechanism.

An important aspect of the invention resides in the means for accurately indexing the forming wheel to exactly the point in its rotation required for proper feeding of the bead wire to the forming wheel. To this end, a positioning member is brought into engagement with a portion of the drive for the bead-forming wheel after the wheel has been stopped by the low-speed drive or decelerating system and by the mechanical brake. This requires that the mechanical brake act positively, in order to stop the forming wheel near enough to its index position so that the positioning member can rotate the forming wheel into its exact position. The accuracy of the mechanical brake, on the other hand, depends on the heavy forming wheel being brought down to a very slow speed, so that it will stop instantly upon application of the mechanical brake.

In most cases the bead-forming machine must be used to produce beads in which the wire is wound three, four, five or more times around the forming wheel, so that beads having three, four, five, etc. wraps of wire are formed. The machine must therefore be reset for each such kind of bead to be formed.

A further object of the present invention is to provide a bead-forming machine which can be changed over in a matter of seconds from winding beads of, say, 4-wraps to beads of, say, 7 wraps. In order to accomplish this, a separate timing device is provided for each number of wraps in the bead to be wound. All the timers are the same but are operated so that each one completes one cycle of operations for the number of revolutions which the forming wheel must make in forming beads of different wraps. Consequently in changing the number of wraps in the beads being produced, a selector switch is turned in order to cut in the desired timer and the bead-forming wheel rotated until the selected timer is cycled to its start position. The change-over can therefore be made very quickly.

The bead-forming machine of the present invention requires little maintenance. It is highly reliable, fast and can be run by operators with very little training. These and other objects and advantages will become more apparent from the description of a machine embodying the invention, which is shown by way of example in the accompanying drawings, wherein FIG. 1 is a front elevation of the machine with the bead-forming wheel shown more or less diagrammatically;

Figure 2:
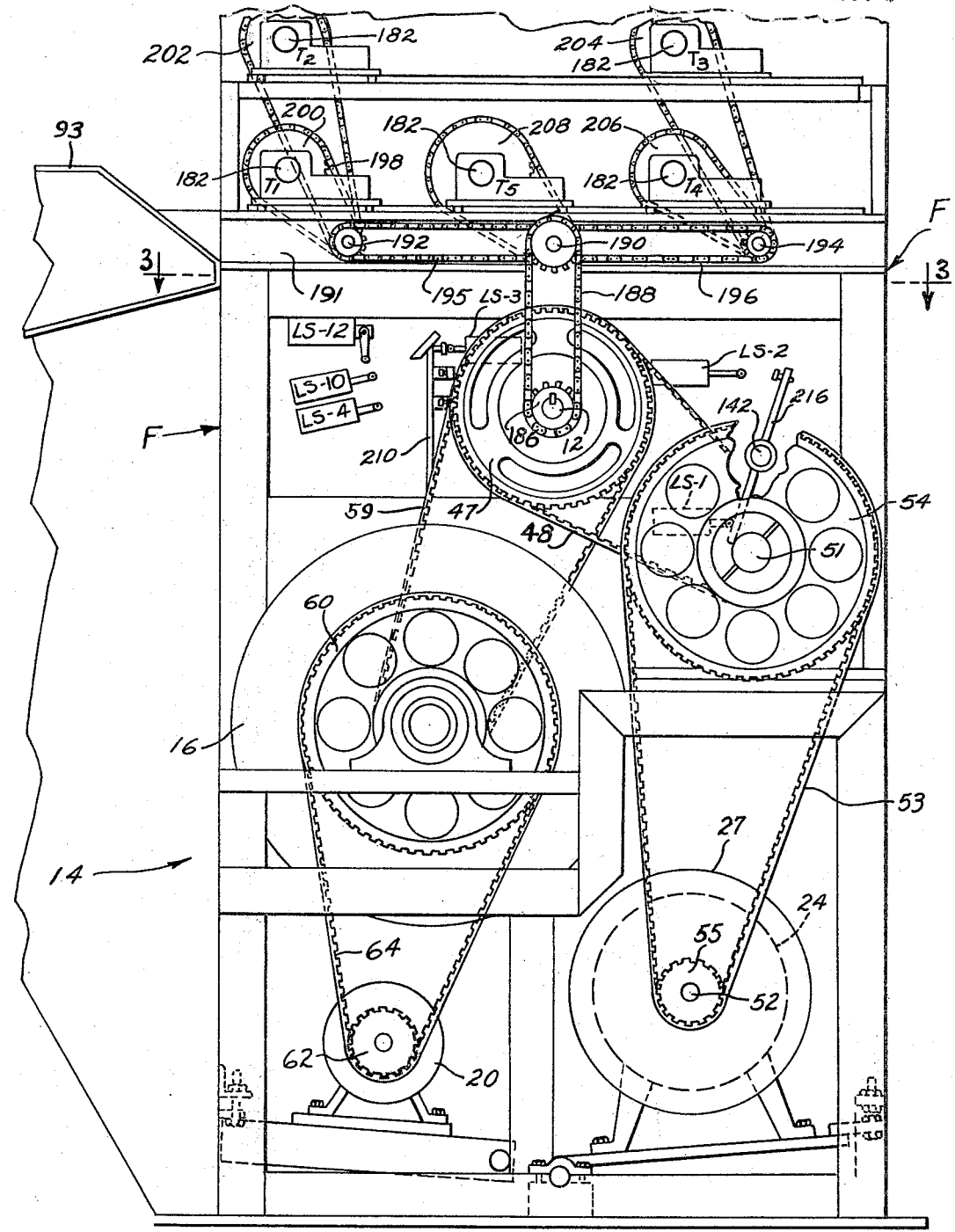
FIGURE 2 is a rear elevation on a larger scale of the main portion of the machine, portions being broken away in order to expose other parts.
Figure 3:
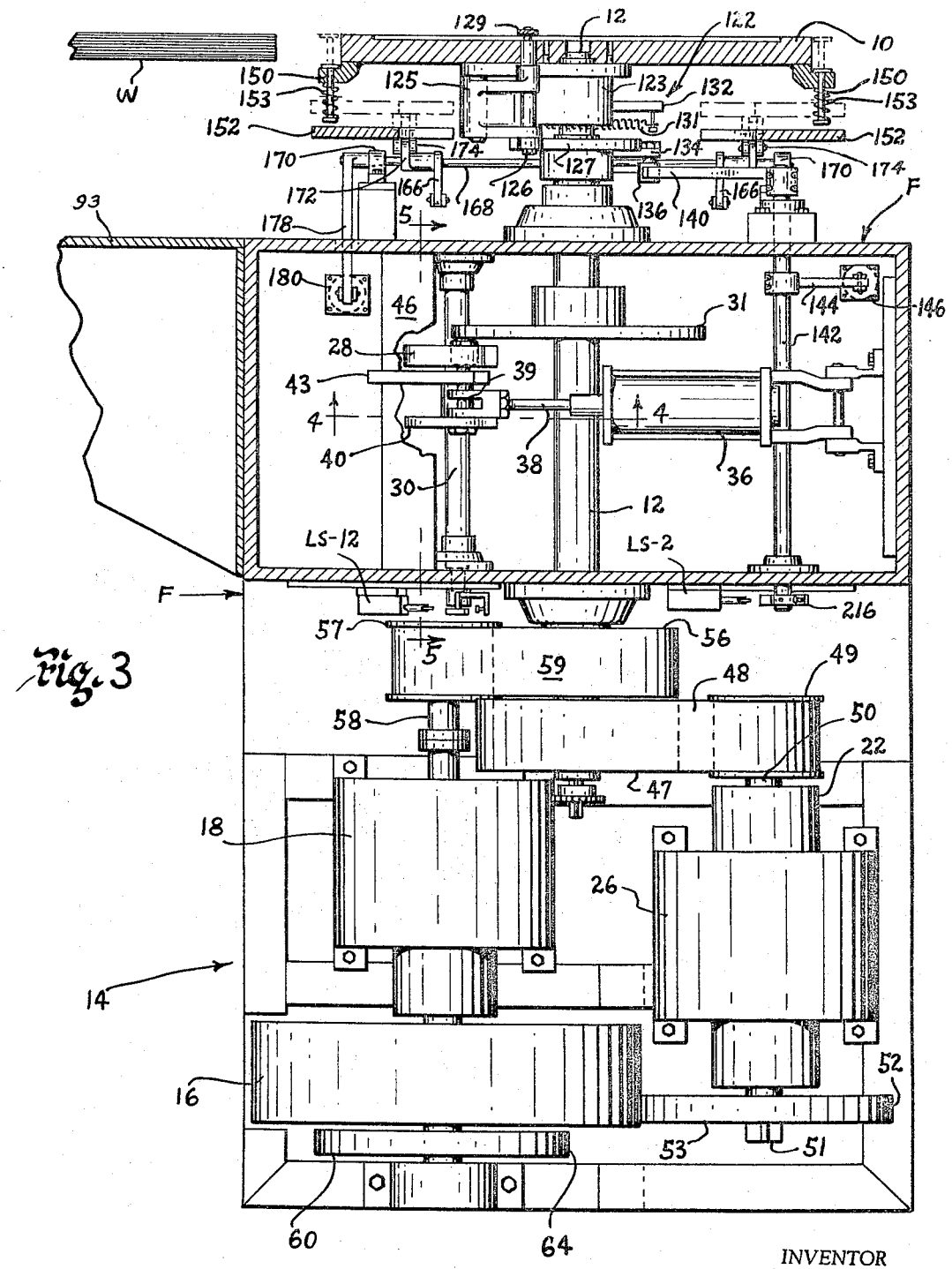
FIG. 3 is a horizontal section taken on the line 3—3 of FIG. 2, and looking in the direction of the arrows.
Figure 4:
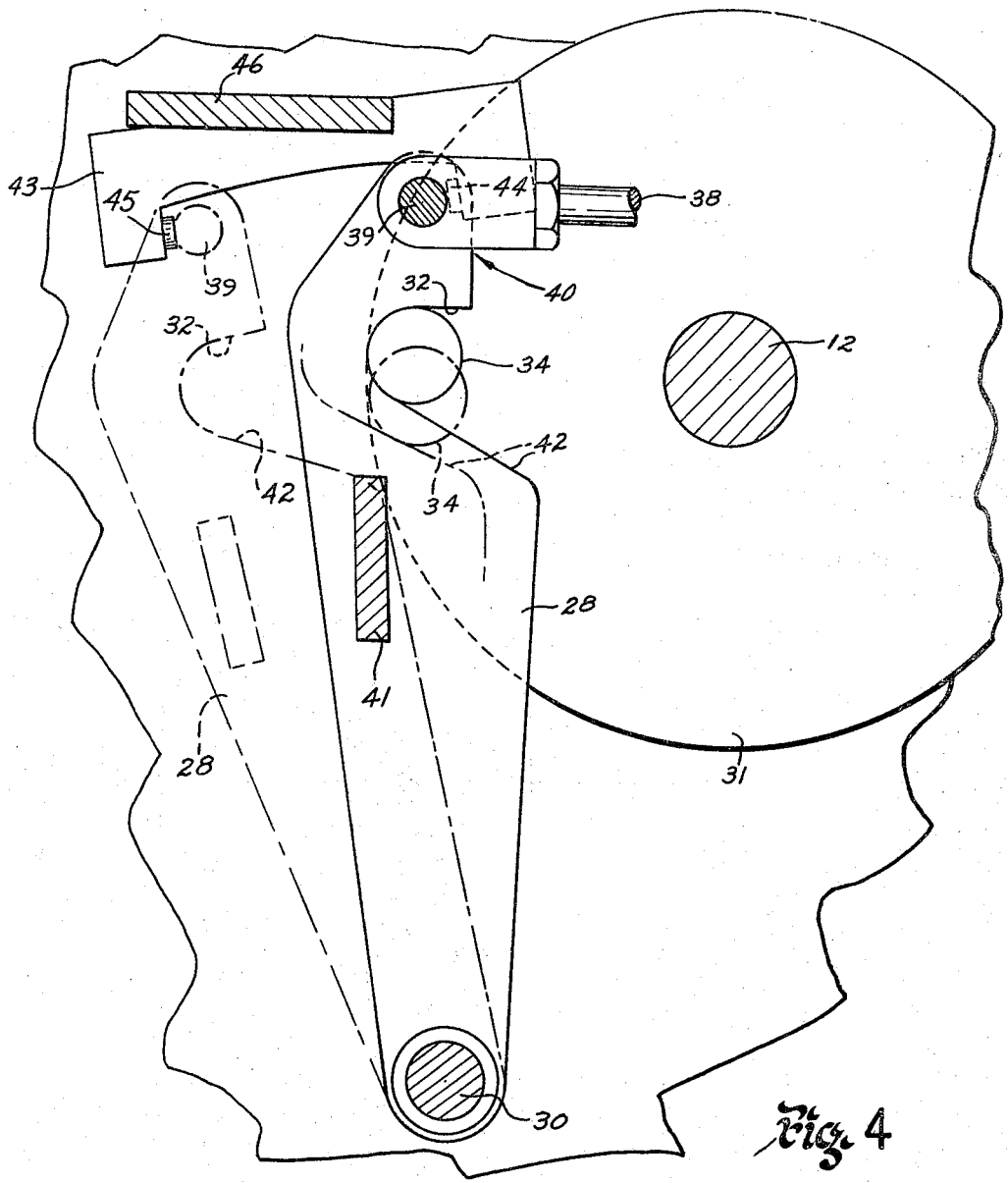
Figure 5:
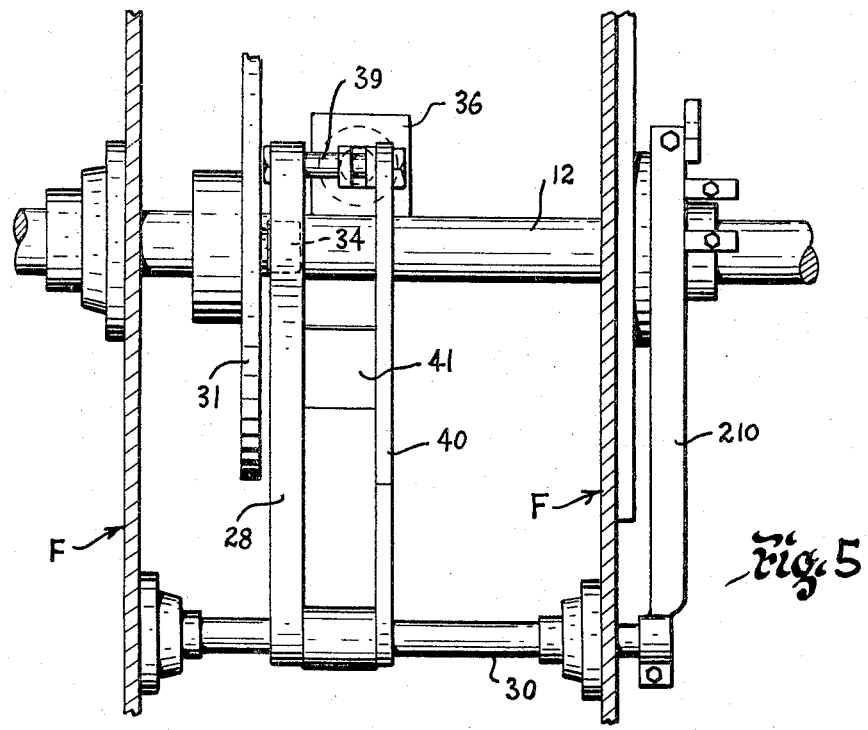
Figure 10:
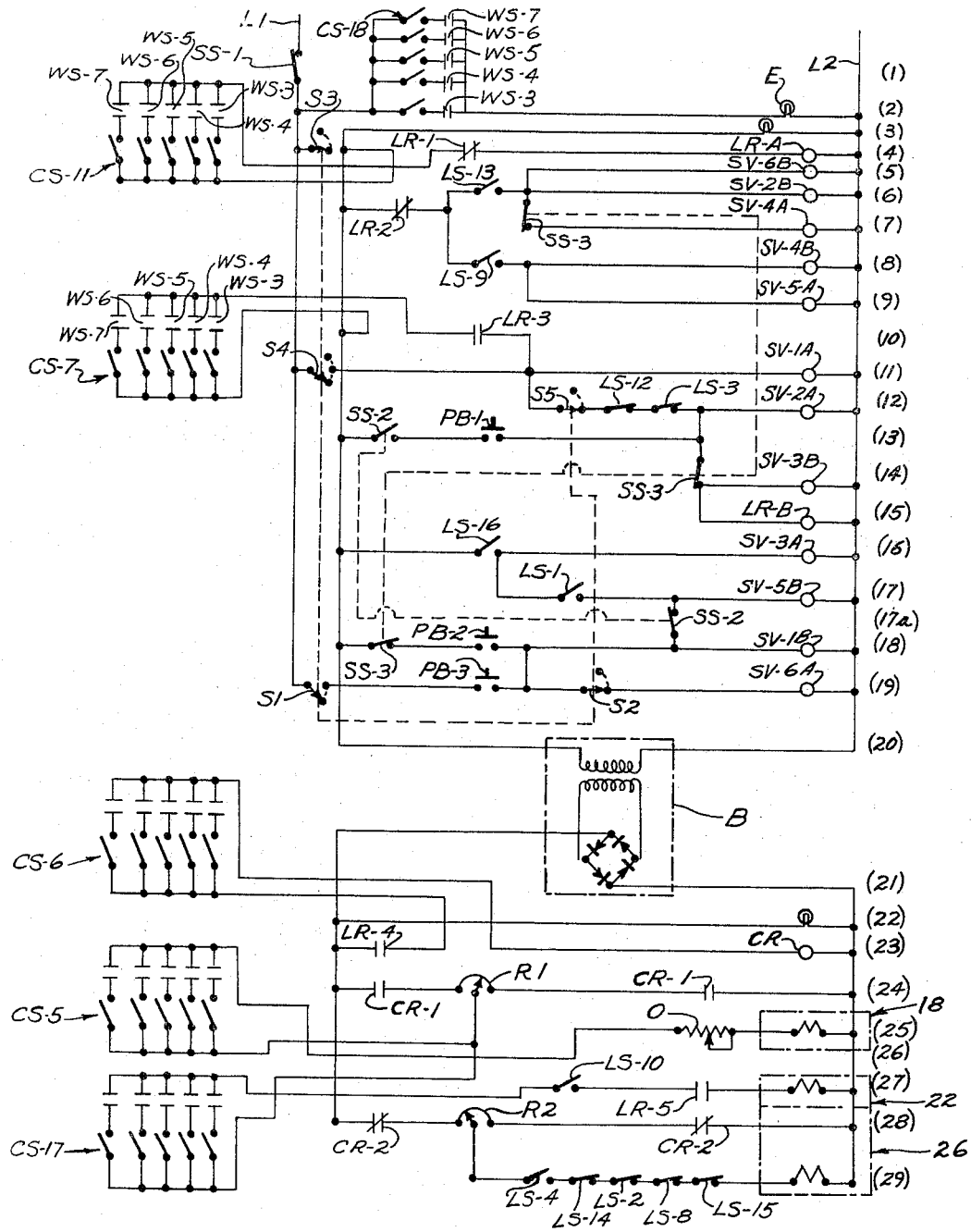
Figure 11:
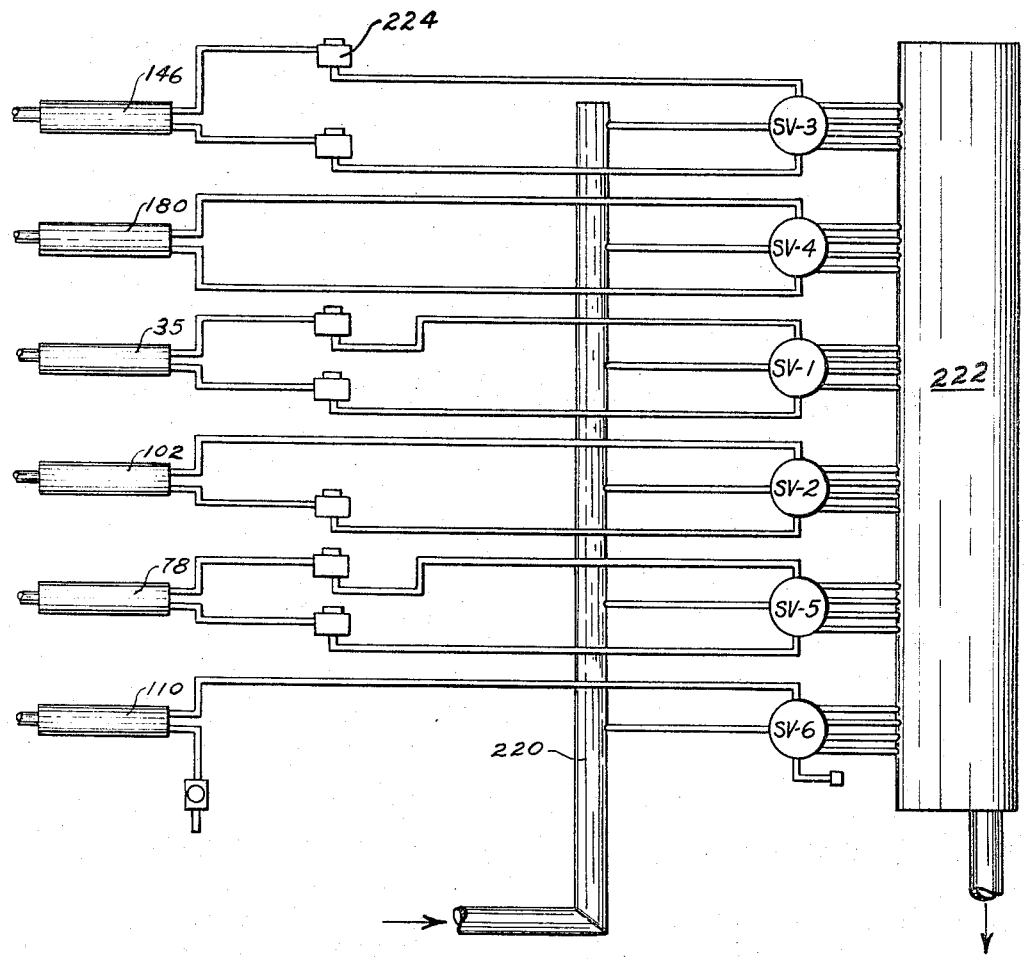

FIGS. 4 and 5 are enlarged detail vertical sections taken on the lines 4—4 and 5—5, respectively, of FIG. 3 and looking in the direction of the arrows:

FIG. 6 is a detail view showing the wire feed mechanism in its feeding position;

FIG. 7 is a detail view showing the pressure roll mechanism and wire cutter looking from in back of the front panel of the frame of the machine;

FIG. 8 is a front elevational view of the machine on the same scale as FIG. 2, with the bead-forming wheel removed and parts broken away in order to show the clamp actuating mechanism at the hub of the forming wheel, as well as the bead-ejecting mechanism;

FIG. 9 is a detail section taken on the line 9—9 of FIG. 8;

FIG. 10 is a wiring diagram of the control circuits for operating the machine;

FIG. 11 is a piping diagram for the pneumatic operating cylinders employed; and

Figure 12:
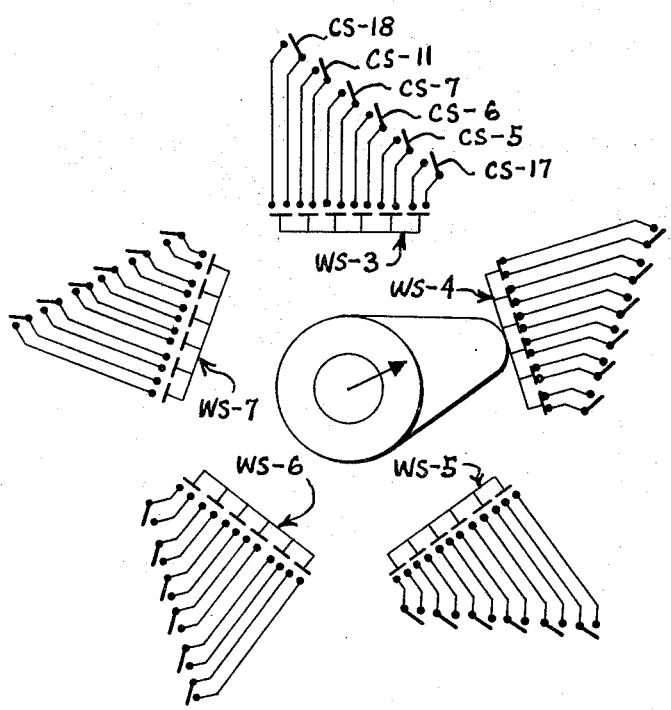

FIG. 12 is a diagram of a wrap-selector switch.

The bead-forming machine of the present invention consists generally of a forming wheel 10, onto which the bead wire W is wound. Forming wheel 10 is mounted on a main shaft 12, journaled on the frame of the machine indicated generally by the reference character F. Bead wire W is formed of relatively stiff strands of metal wire, around which is extruded a coating of rubber-like material. As the wire comes from the tuber or extruding machine (not shown), it is flat or ribbon-like in configuration, and the end of the wire is fed in the usual manner into a clamp 13 on the periphery of forming wheel 10. The forming wheel is then rotated at high speed from this starting position an exact number of revolutions in order to wrap bead wire W into a hoop having the desired layers of wire. The more common tire beads consist of from three to seven wraps of wire, each wrap of course requiring one revolution of the forming wheel.

As each bead is wound, the forming wheel 10 is brought to a complete stop, the wire cut, clamp 13 on the forming wheel released and the bead ejected from the forming wheel. In order to ensure proper feed of the end of the wire into clamp 13, the wheel must be stopped at exactly the same position of rotation after each bead is wound regardless of the number of wraps in the bead. Clamp 13 remains open as each bead is ejected from the wheel and is therefore ready to receive the end of the continuous length of wire W from which the previous bead was cut. The winding cycle is then repeated to form the next bead. Usually at least two beads are formed at a time by extruding several groups of wires side-by-side and splitting them apart longitudinally before they are wound on the forming wheel. The foregoing general description of the manner in which the tire beads are formed is basically the same as methods used heretofore.

In accordance with one aspect of the present invention, the means for bringing the heavy forming wheel 10 to a complete and accurate stop includes a decelerating system shown generally at 14 (FIGS. 2 and 3). The system includes a constantly rotating flywheel 16 which is brought into and out of operation with forming wheel 10 by means of a magnetic clutch 18. Flywheel 16 is driven by a motor 20 at a much slower speed than the winding speed of forming wheel 10, so that upon energization of clutch 18 the decelerating system 14 becomes operatively engaged with the main drive shaft 12, causing forming wheel 10 to slow down rapidly. Once slowed to a creep, forming wheel 10 is then brought to a dead stop by a mechanical brake 22 (FIG. 3) in the main drive.

A drive motor 24 (FIG. 2) is coupled to the main shaft 12 of forming wheel 10 through a second magnetic clutch 26 (FIG. 3) similar to that used in the dynamic braking system 14. Clutch 26 permits main drive motor 24 to be disconnected from the forming wheel 10 when the dynamic brake is applied. Drive motor 24 runs continuously and has a flywheel 27 which helps to maintain its speed as the weight of forming wheel 10 is applied to it through clutch 26 in order to bring the forming wheel up to speed.

After forming wheel 10 is stopped, first by application of the decelerating system 14 and then by applying the mechanical brake 22, a positioning arm 28 (FIGS. 3, 4 and 5) is actuated so as to move the wheel into its starting or zero position and to lock it in place. Positioning arm 28 is located within the frame F of the machine behind forming wheel 10, as shown in FIG. 3, and is pivoted at one end on a rocker shaft 30 journaled between front and rear frame members, so that it can be swung into and out of cooperating engagement with a locking wheel 31 mounted on drive shaft 12 for rotation with the forming wheel. A locking notch 32 is formed in one edge of positioning arm 28 adjacent its outer end to receive a roller or cam follower 34, which is mounted on locking wheel 31 near its periphery. Roller 34 fits snugly in the bottom of not 32 so that locking wheel 31, shaft 12 and forming wheel 10 are rigidly locked against rotation when positioning arm 28 is moved into locking engagement with roller 34 as shown in the solid-line position in FIG. 4. A double-acting power cylinder 36 (FIG. 3) mounted on one side of the frame F of the machine has its piston rod 38 pivotally connected to a pivot shaft 39 at the outer end of positioning arm 28, in order to move arm 28 into and out of locking engagement with roller 34.

Positioning arm 28 is supported by a parallel arm 40 rigidly secured to it at both ends by means of pivot shaft 39 and rocker shaft 30 and in the middle by a brace 41. Both arms 28 and 40, therefore, swing together as a unit on rocker shaft 30.

It will be noted that the mouth of locking notch 32 on positioning arm 28 is enlarged, the lower edge 42 of notch 32 extending outwardly for camming engagement with roller 34 which is stopped by brake 22 at the position shown in broken lines in FIG. 4, just short of its locking position. Engagement of the camming edge 42 of notch 32 with roller 34 causes forming wheel 10 to be rotated a few degrees into the correct position, so that the end of the bead wire W can be fed into clamp 13. When positioning arm 28 is fully engaged with roller 34 in its solid-line position, as shown in FIG. 4, the forming wheel 10 is held locked against rotation.

In order to positively limit the travel of positioning arm 28, a stop plate 43, having inner and outer abutments 44 and 45, is secured to a fixed frame member 46 of the machine. When positioning arm 28 is fully engaged with locking roller 34, its pivot shaft 39 engages abutment 44, and when position arm 28 is completely withdrawn, its pivot shaft 39 engages abutment 45.

Referring in greater detail to the drive mechanism for forming wheel 10, best shown in FIGS. 2 and 3, main drive shaft 12 is provided at its rear end with a large sprocket 47 which is connected through a timing belt 48 to a smaller sprocket 49 on the driven shaft 50 of magnetic clutch 26. The driving shaft 51 of clutch 26 is in turn coupled to the shaft 52 of drive motor 24 by means of a timing belt 53, which is trained over a large sprocket 54 on shaft 51 and a smaller sprocket 55 on shaft 52. Suitable speed reduction between drive motor 24 and main drive shaft 12 is obtained by using sprockets of different size.

A second large sprocket 56 is provided on main shaft 12 just forward of drive sprocket 47, coupling shaft 12 with a smaller sprocket 57 on a shaft 58 of the decelerating system 14 through a timing belt 59. Shaft 58 is on the output side of magnetic clutch 18. On the opposite side of magnetic clutch 18, and directly coupled therewith, is journaled the decelerating flywheel 16, which in turn is driven by the motor 20 through sprockets 60, 62 and timing belt 64. As mentioned hereinbefore, flywheel 16 rotates continuously at a much slower speed than forming wheel 10 is driven by the drive motor 24 when a bead is being wound. Consequently, upon de-energizing main drive clutch 26 and energizing the decelerating clutch 18, the heavy forming wheel, which is rotating at high speed, is first slowed to a low speed and then brought to a dead stop by application of a mechanical brake 22. Brake 22 is an integral part of main drive clutch 26 and is directly connected to the driven shaft 50 thereof. With forming wheel 10 and its drive shaft 12 rotating at slow speed, brake 22 can be timed to accurately stop the forming wheel so that the cam roller 34 on locking wheel 31 will always be engaged by the camming edge 42 of the locking notch on positioning arm 28, as shown in the broken-line position in FIG. 4.

With forming wheels which weigh on the order of 20 to 55 pounds each, depending on their size, it has been found in actual practice that precise stops can be made during one revolution of the forming wheel from a speed of about 225 r.p.m. by using a 200 pound braking flywheel, which is driven at a constant speed of 30 r.p.m. by a 0.5 H.P. gear head motor. The magnetic clutches employed in this instance are commercially available and are manufactured by Warner Electric Brake and Clutch Company of Beloit, Wis., under the trade name "Electro-Pak," Model EP825.

Figure 1:
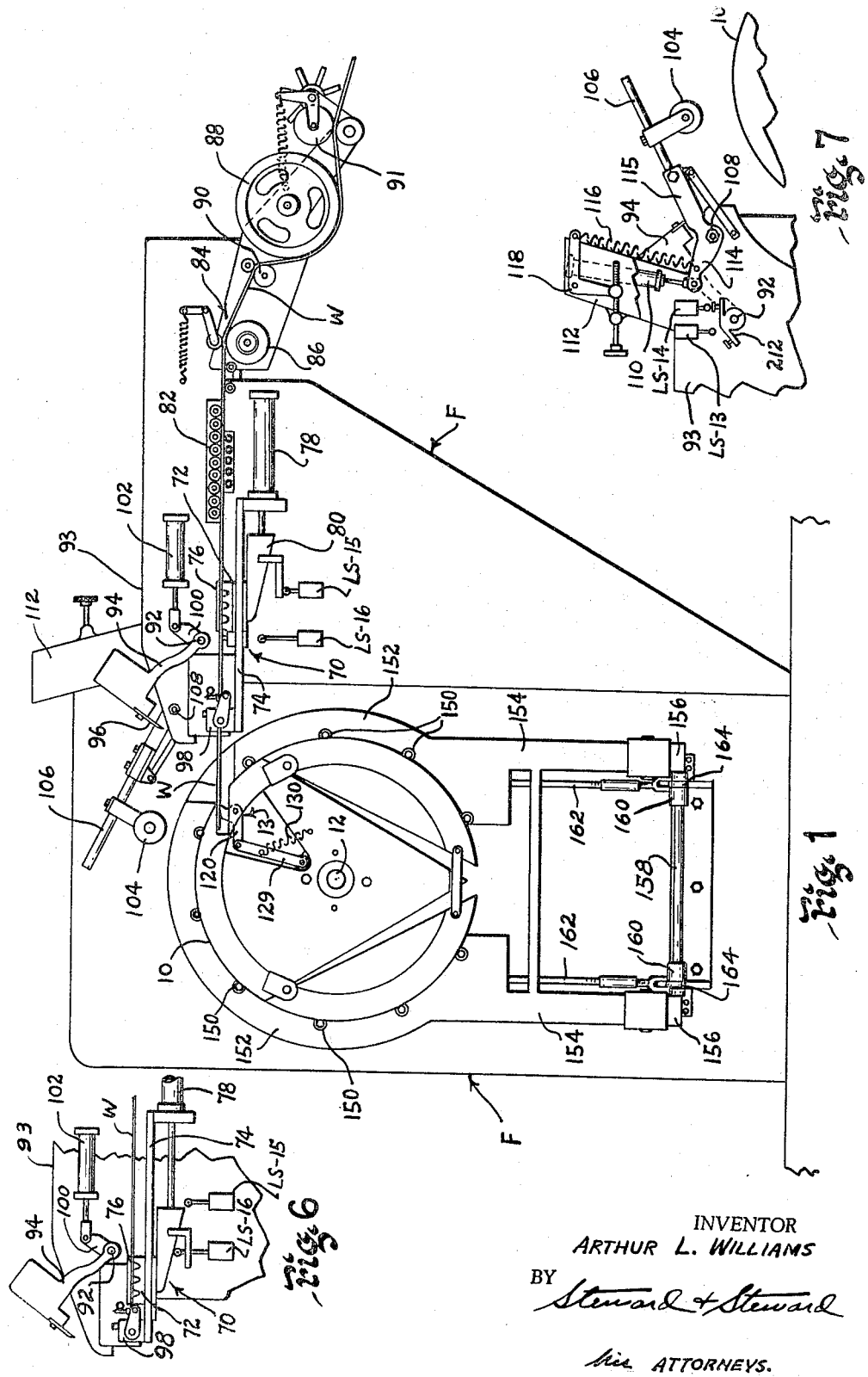

Adjacent forming wheel 10 and to one side thereof, as viewed in FIG. 1, is provided the bead-wire feeding mechanism, indicated generally at 70, which consists of a feeding carriage 72 slidably mounted on a pair of horizontal tracks 74 suitably supported on the frame F of the machine. A gripper 76 having friction jaws, which engage bead wire W top-and-bottom, is mounted on carriage 72 and is actuated upon forward movement of carriage 72 (to the left as viewed in FIG. 1) in order to grip the wire and move the end thereof into clamp 13 on forming wheel 10. When the jaws of clamp 13 close locking wire W to wheel 10, carriage 72 is returned to its starting position, as shown in FIG. 1. Reversal of the direction of travel of carriage 72 at the start of its return stroke causes gripper 76 to automatically release wire W so that carriage 72 is free to return. A wire-feed cylinder 78 is mounted on frame F in back of and below carriage 72 for driving connection therewith by means of a bracket 80 on the underside of carriage 72. Cylinder 78 slides carriage 72 forward on tracks 74 to the position shown in FIG. 6 to feed and then returns the carriage.

Before entering feeding carriage 72, bead wire W travels through guide rollers 82 after passing through a set of friction rollers 84 having a one-way clutch 86, which prevents the wire from slipping backward upon being cut free from forming wheel 10 and before the feed mechanism 70 takes hold. A large diameter pulley 88 is rotatably mounted at the wire-supply side of the forming machine, and the wire is fed under pulley 88 and then upward over a smaller guide-wheel 90 which places a permanent cast in the bead wire so that so that the leading end of the wire lies properly on the forming wheel 10 when it is fed thereto and the trailing end lies snug against the finished bead. Where the beads are wound in pairs, the wire W is split longitudinally by a rotary blade 91 just before it reaches pulley 88.

Pivoted on a shaft 92, which is journaled in a front panel portion 93 of frame F of the machine, is a weighted cutter arm 94 having a cutting blade 96 for cutting the bead wire W off at the end of each bead-forming cycle. The bead wire travels through a cutting die-block 98 located directly below blade 96, and cooperating therewith, so as to sever the bead wire when cutter arm 94 is pivoted counterclockwise, as viewed in FIGS. 1 and 6. An actuating lever 100 is fixed to pivot shaft 92 and connected to the piston rod of a power cylinder 102 for pivoting cutter arm 94 down and back during each cutting stroke.

As the bead wire W is wound onto forming wheel 10, a pressure wheel 104 engages it on the forming wheel, pressing downward against the periphery of wheel 10 so that the layers or wraps of wire stick together due to the inherent tackiness of the unvulcanized cover of the bead-wire. Pressure wheel 104 is mounted for longitudinal and transverse adjustment on an arm 106 pivoted on a fixed shaft 108 extending rearwardly of the front panel 93 of frame F adjacent the cutter 94.

A vertically disposed power cylinder 110 is mounted on an upstanding support member 112 secured to the upper edge of front panel 93. Power cylinder 110 is connected to one arm 114 of a crank member 115, on which pressure arm 106 is mounted. Actuation of cylinder 110 presses lever arm 114 downward, causing pressure arm 106 to raise and to lift pressure wheel 104 from engagement with forming wheel 10. A coil spring 116 is stretched between a pressure-adjusting linkage 118 at its upper end and crank arm 114 at its lower end, thus, urging pressure wheel 104 into engagement with forming wheel 10. When power cylinder 110 is vented, pressure wheel 104 is moved into operating engagement with the forming wheel. The pressure exerted by wheel 104 on the bead is adjusted by increasing or decreasing the tension of spring 116 by means of linkage 118.

Reference is again had to the forming wheel 10, to which the bead wire W is clamped and then drawn onto the periphery of the wheel as the latter is rotated in a counterclockwise direction as viewed in FIG. 1. Forming wheel 10 is a conventional design and is similar to those used in machines known as F.S.W. bead-forming machines manufactured by the National Standard Company of Niles, Mich. Since the forming wheel by itself forms no part of the present invention, the wire clamp 13 is shown more or less schematically as having a pivoted dog 120, which is opened and closed by the clamp-actuating mechanism 122 (FIGS. 3 and 8) in the mounting hub for wheel 10.

Actuating mechanism 122 is mounted on main drive shaft 12 for the forming wheel and rotates with it as the beads are wound. A hub 123 has mounting studs 124 by which forming wheel 10 is removably mounted on shaft 12. A cam follower 125 is pivoted to a lobe-portion of hub 123 for engagement of its roller 126 with a cam disk 127. Cam disk 127 is mounted for limited rotation relative to hub 123 and has a depression 128 into which roller 126 is urged when wire clamp 13 is closed. A link 129 connects cam follower 125 with wire clamping dog 120 of clamp 13, so that when link 129 is moved radially outward by roller 126 of cam follower 125, clamping dog 120 is opened. A closing spring 130 stretched between link 129 and a mounting stud on a fixed portion of forming wheel 10 urges roller 126 of cam follower 125 into engagement with cam disk 127, and at the same time closes dog 120 when roller 126 drops into the depression 128 of said cam disk.

Cam disk 127 is urged in a clockwise direction as viewed in FIG. 8 by a cam spring 131, which stretches between a stud on cam disk 127 and a mounting finger 132 fixed to the hub 123. A releasing arm 134 projects upwardly from the back side of cam disk 127 to which it is rigidly fastened, and a roller 136 is provided at the outer end of arm 134 for engagement by a releasing lever 140. Upon engagement of releasing lever 140 with roller 136 of arm 134, cam disk 127 is rotated in a counterclockwise direction causing cam follower 125 to be pivoted out of depression 128 and opening clamping dog 120.

Releasing lever 140 is fixed to a horizontal shaft 142 journaled in frame F and extending perpendicularly through the front and rear panels thereof. Fixed to clamp-releasing shaft 142 just in back of the front panel of frame F is a crank arm 144, to the outer end of which is connected a power cylinder 146, by which shaft 142 and releasing lever 140 are pivoted for actuation of the wire-clamp releasing mechanism. Cylinder 146 is mounted vertically on the frame F of the machine adjacent the front panel with its piston rod disposed upwardly for connection with crank arm 144.

After each bead is wound, the wire W is cut and clamp 13 released by actuation of releasing cylinder 146. The bead or pair of beads, as the case may be, are then ejected from the forming wheel 10 by means of a plurality of ejecting pins 150 mounted on and disposed circumferentially around the periphery of wheel 10 pins 150 are mounted on the back side of wheel 10 and rotate with it during the winding operation. The front ends of pins 150 are normally retracted behind the rear edge of the wheel so as not to interfere with the winding of the beads, while the rear ends project some distance behind the forming wheel. Directly in back of ejecting pins 150 for engagement with their rear ends is a yoke-shaped ejecting plate 152 disposed parallel to the plane of forming wheel 10 and mounted for reciprocal movement into and out of engagement with the rear ends of pins 150. As ejecting plate 152 moves forward toward wheel 10, it forces pins 150 forward across the periphery of wheel 10 pushing the bead off the forming wheel onto a storage rack (not shown) provided therefor. Ejecting plate 152 then moves back out of engagement with pins 150, each of which is retracted individually by a return spring 153.

Ejecting plate 152 has a pair of parallel legs 154 extending downwardly from its circular working surface, legs 154 being mounted on a pair of push-levers 156 secured to a horizontal crank shaft 158 which extends between legs 154. Shaft 158 is journaled in suitable bearing blocks 160 mounted on the front panel of frame F. Vertical connecting rods 162 are pivotally connected at their lower ends to crank arms 164 fixed on shaft 158 adjacent each push-lever 156, and at their upper ends to similar crank arms 166, which are rigid with an upper crank shaft 168. Upper shaft 168 is parallel to shaft 158 and journaled adjacent its outer ends in suitable bearing blocks 170 on frame F. Inermediate each of crank arms 166 and bearing blocks 170 is an upper push-lever 172 having a pair of rollers 174 at its end for engagement with the back of ejecting plate 152, as shown in FIG. 3. The top of ejecting plate 152 is fastened to a centrally located spring-return plunger 176 (FIGS. 8 and 9) mouned in the front panel of frame F.

Upper crank shaft 168 extends beyond bearing block 170 at its right end, as viewed in FIG. 8, and has an actuating lever 178 fixed thereto. Actuating lever 178 extends rearwardly through an elongated opening 179 in the front panel of frame F for connection with a power cylinder 180 mounted on the inside of frame F for pivoting the linkage on which ejecting plate 152 is mounted. Thus, upon pivotal movement of upper crank shaft 168, both the upper pair of push-levers 172 and lower pair of push-levers 156 swings out or in, causing ejector plate 152 to move bodily into or out of engagement with ejecting pins 150 on forming wheel 10 in order to eject the finished beads.

Start-up, braking and indexing of forming wheel 10 is controlled by a series of cam switches in an electromechanical timer which is driven by the main drive shaft 12, while operation of the wire feed, clamping, cutting and ejecting mechanisms is carried out by means of limit switches which are actuated in sequence by the various parts of the machine during each cycle of operations, as will be more fully described hereinafter. The bead-forming machine of the present invention may be quickly set-up and changed-over for winding beads with different numbers of wraps or layers per bead. To this end, several separate and independent timers are employed in connection with the drive control for the forming wheel, one for each type of bead to be formed according to the number of wraps it is to have. For example, if the beads to be run are to have four wraps each, one of the timers is connected into the electric control circuit so that the forming wheel 10 rotates exactly four revolutions during each bead-forming cycle. Or, if each bead is to contain seven wraps, another timer is connected into the circuit and the 3-wrap timer cut out. A manually operated selector switch is used to shift from one timer to another, and of course only one timer is actually in use at a time.

In the present case five separate timers, designated $T_1$, $T_2$, $T_3$, $T_4$, and $T_5$ (FIG. 2), are employed for winding from three to seven wraps per bead. A suitable timer for the purpose is manufactured by Eagle Signal Company of Moline, Illinois, and bears the commercial designation "Eagle Signal Type H.L. 6A 611, No. 649649–11–1." Each of the timers T include a cam shaft 182, on which are rotated a series of several cams, in this case six, which actuate cam-switches in order to complete or set-up circuits in the control system to magnetic clutches 18 and 26 for the drive and braking system, as well as for actuating positioning arm 28. Cam-shafts 182 are driven simultaneously by main drive shaft 12 for forming wheel 10 through timing sprockets and chains. A sprocket 186 at the rear end of drive shaft 12 behind drive sprocket 47 is coupled by means of an endless chain 188 to a shaft 190 journaled in a suitable supporting structure 191 for timers T located on the top of frame F of the machine. Shaft 190 in turn drives shafts 192 and 194 on opposite sides of it through a pair of chains 195, 196. Shafts 12, 190, 192, and 194 all rotate at the same speed. Each of shafts 190, 192 and 194 extend forwardly through the supporting structure 191 and are provided with drive sprockets at their forward ends for driving the cam-shafts 182 of timers T.

Timer $T_1$ is used when winding 3-wrap beads and is driven at a 1-to-3 speed ratio with respect to forming wheel 10, so that for every three revolutions of forming wheel 10 the cam-shaft 182 of timer $T_1$ makes one complete revolution. This is accomplished by using a 20-tooth drive sprocket on shaft 192 which is coupled through an endless chain 198 with a 60-tooth sprocket 200 on timer $T_1$.

Similarly, timers $T_2$, $T_3$, $T_4$, and $T_5$ are each driven at different speeds with respect to forming wheel 10 such that wheel 10 turns over four, five, six and seven revolutions, respectively, during each bead-forming cycle in winding beads with corresponding numbers of wraps. Thus, shaft 192 is also provided with a 12-tooth sprocket, driving a 48-tooth sprocket 202 on the cam-shaft of timer $T_2$, which therefore completes one cycle for every four revolutions of forming wheel 10. A 60-tooth sprocket 204 is used on timer $T_3$ and is driven by a 12-tooth sprocket on shaft 194 for a 1-to-5 speed ratio, while a 72-tooth sprocket 206 on timer $T_4$ is driven by a second 12-tooth sprocket on shaft 194 for a 1-to-6 ratio. Timer $T_5$ has an 84-tooth sprocket 208 driven by a 12-tooth sprocket on shaft 190 for a 1-to-7 speed ratio. Each timer cam-shaft 182 of course rotates once during each cycle of operations of the bead-forming machine and, as already mentioned, only one timer is in use at a time, even though all five timers are driven simultaneously by main drive shaft 12 of the forming wheel.

Reference is now made more particularly to the wiring diagram of FIG. 10, wherein $L_1$ and $L_2$ designate the leads from a 115-volt A.C. power supply for the various control circuits for the power cylinders. A rectifier in transformer B furnishes direct current to the control circuits for engaging and disengaging the magnetic clutches 18 and 26, as well as the mechanical brake 22, in the main drive for the forming wheel 10. In order to facilitate reference to the circuits in the wiring diagram of FIG. 10, the lines across the A.C. and D.C. power supply mains are numbered from top to bottom in the right-hand margin. In setting the machine up to run, a main power switch SS–1 (line 1) is closed, and the number of wraps per bead is selected by turning a wrap-selector switch (FIG. 12) to the desired setting in order to cut-in the cam switches (designated by the letters CS in FIGS. 10 and 12) of the particular timer which causes forming wheel 10 to rotate the required number of revolutions for each bead-forming cycle. For convenience of illustration, the cam switches of the five separate timers are shown grouped in FIG. 10 according to the particular function performed by each of the six cam switches CS–5, CS–6, CS–7, CS–11, CS–17 and CS–18 in each timer, whereas in FIG. 12 they are shown grouped according to the timer. Since the timers are wired in parallel, closing any of the five sets of contacts WS–3, WS–4, WS–5, WS–6 or WS–7 of the wrap-selector switch, sets up the circuits controlled by the cam switches of that particular timer. The sequence of operations of the timer cam switches is substantially the same for each timer, so that a description of the operation of the machine for forming one type of bead will suffice for any of the others.

Cam switches CS–18 are provided in order to synchronize the timer with the forming wheel 10, so that the timer selected will be at the beginning of its cycle when the bead-forming is started. Each cam switch CS–11 controls a latch-relay solenoid LR–A (line 4, FIG. 10), while cam switch CS–7 energizes a solenoid SV–1A (line 11) in a solenoid valve SV–1 (FIG. 11) for engaging the positioning arm 28 for the forming wheel. Cam switch CS–6 energizes a control relay solenoid CR (line 23) for disengaging the main drive clutch 26; CS–5 engages the deceleratnig clutch 18; and CS–17 engages the mechanical brake 22 in order to bring it to a dead stop, so that positioning arm 28 can cam the forming wheel into position.

In order to set the timer which has been selected at the start of its cycle, the forming wheel 10 is rotated manually until an indicator light E (line 2) is lighted, showing that cam-switch CS–18 is closed. Since CS–18 is closed only at the beginning of each cycle, the operator knows when E is lit that the timer is properly set at the start of its cycle. However, before the forming wheel 10 can be rotated for setting the timer, positioning arm 28 must be disengaged. This is accomplished by throwing a multi-pole double-throw switch on the control panel to its "Wrap Change" position, which closes contacts S1 at line 19 and opens contacts S2, S3 and S5 at line 19, 4 and 12, respectively, in order to deactivate all of the automatic control circuits that normally function when positioning arm 28 is disengaged. Now, by actuating a push-button switch PB-3 (line 19), in a circuit connected directly between feed lines $L_1$ and $L_2$, a solenoid SV-1B (line 18) is energized, reversing power cylinder 35 and withdrawing positioning arm 28 from locking engagement with locking wheel 31 on drive shaft 12, thus releasing forming wheel 10 so that it can be rotated manually to the position at which indicator light E comes on. The positioning arm 28 is then re-engaged by reversing the "Wrap Change" switch, which opens contacts S1 (line 19) and momentarily closes contacts S4 (line 11) in order to energize solenoid SV-1A long enough to reverse cylinder 35, which then draws positioning arm 28 into locking engagement with locking wheel 31.

The bead wire W having been previously fed through guide rollers 82 and locked to feed mechanism 70 with its free end extending through the cutting die-block 98, is cut-off to the right length and then fed to the forming wheel by actuation of a push-button switch PB-1 in the circuit to a solenoid SV-2A (line 12), of a solenoid SV-2 (FIG. 11), which causes the cutter cylinder 102 to operate cutter 94. Prior to this, however, a multi-pole, double-throw switch SS-2 is thrown to a manual-operation position, closing its contacts SS-2 at line 13 so that solenoid SV-2A will be energized when PB-1 is closed. Actuation of PB-1 operates both cutter 94 and the wire-feed mechanism 70 in order to cut the wire, feed it into clamp 13, lock it and retract the wire-feed mechanism 70, all as more fully described hereinafter. Switch SS-2 is then placed in position for automatic operation, opening its contacts at line 13 and closing a set of contacts SS-2 at line 17a of FIG. 10. The machine is now ready to run.

At the start of each bead-forming cycle, the following conditions exist: (1) positioner 28 is engaged; (2) bead wire W is clamped to forming wheel 10; (3) wire feed 70, cutter 94, pressure wheel 104 and bead ejecting plate 152 are all retracted; (4) both the high-speed drive motor 24 and brake motor 20 are running but disengaged from drive shaft 12; (5) switch SS-1 in the supply line to the control circuits is closed; and (6) air pressure is turned on for the various power cylinders. Automatic operation of the machine is initiated by actuation of a starting switch PB-2 (line 18, FIG. 10), which energizes solenoid SV-1B of valve SV-1 in the air supply system to positioning arm cylinder 35, disengaging positioning arm 28 from locking engagement with the roller 34 on locking wheel 31. Upon disengagement of positioning arm 28, shaft 30 to which arm 28 is fixed is pivoted, causing a switch-operating lever 210 (FIGS. 2 and 5) fixed to the rear end of shaft 30 to swing counterclockwise from the position shown in FIG. 2 into engagement with the actuating arms of three limit switches LS-4, LS-10 and LS-12 mounted on the back panel of frame F. Actuation of these switches by lever 210 closes LS-4 and LS-10 and opens LS-12.

When limit switch LS-4 (line 29, FIG. 10) closes, the control circuit for engaging the main drive clutch 26 is energized, in order to rotate forming wheel 10 at high speed. Actuation of the starting switch PB-2 also completes a circuit to a solenoid SV-6A (line 19) in a valve SV-6 (FIG. 11) exhausting cylinder 110 and lowering pressure roller 104 into engagement with forming wheel 10. The bead is then wound on the forming wheel. As described hereinbefore, the timers each make one revolution for the number of revolutions through which the forming wheel rotates during each bead-forming cycle. About one revolution before the forming wheel is to come to a dead stop, cam switches CS-5 and CS-6 of the timer close, engaging brake clutch 18 and disengaging drive clutch 26.

Closing of CS-5 sets up a circuit (line 25) through a rheostat R1 and a variable resistor O to magnetic clutch 18, so that upon closing of normally open contacts CR-1 (line 24), flywheel 16 is engaged with the main drive shaft 12. Contacts CR-1 close when a control relay CR (line 23) is energized by the closing of cam switch CS-6. At the same time, control relay CR also opens normally-closed contacts CR-2 (line 28) in a circuit through a rheostat R2, which furnishes power to engage main drive clutch 26.

Within about one revolution after decelerating clutch 18 has been engaged, forming wheel 10 has slowed to the speed at which it is driven by the decelerating system 14. Mechanical brake 22 in the main drive can then be safely engaged to stop the forming wheel 10 instantly. Brake 22 is in this instance incorporated in the same Warner "Electro-Pak" unit with magnetic clutch 26, and is actuated upon completion of a control circuit thereto (line 27) when cam switch CS-17 in the timer closes. Simultaneously with actuation of mechanical brake 22, the decelerating system is disengaged by opening of cam switch CS-5 in the timer, thereby de-energizing clutch 18. Application of brake 22 is timed so that forming wheel 10 stops within about a quarter of an inch of the position desired, such that the cam roller 34 on the locking wheel 31 will be engaged by the camming edge 42 on position arm 28 when the latter is moved into locking position.

At about the same time that mechanical brake 22 is applied, cam switch CS-7 (line 11) also closes, completing a circuit to solenoid SV-1A, which actuates the power cylinder 35 in order to move positioning arm 28 back into locking engagement with locking wheel 31. As positioning arm 28 starts into engagement with locking wheel 31, its switch-operating lever 210 moves out of engagement with and reverses limit switches LS-4, LS-10 and LS-12 which: (1) opens the circuit to main drive clutch 26 (line 29, FIG. 10); (2) opens LS-10 (line 27) in the circuit for the mechanical brake 22, thereby releasing brake 22 so that forming wheel 10 is free to be cammed by positioning arm 28; and (3) closes LS-12 (line 12), which is a safety switch to prevent operation of the wire cutter 94 whenever the positioning arm 28 is disengaged. When positioning arm 28 reaches full locking engagement with locking wheel 31, its switch-operating lever 210 engages and closes a limit switch LS-3 (FIG. 2) closing the circuit to solenoid SV-2A (line 12), which actuates the power cylinder 102 for wire cutter 94 so that the wire is cut as soon as forming wheel 10 is locked in place. Closing of LS-3 likewise completes a circuit to a solenoid SV-3B (line 14) of a valve SV-3 (FIG. 11), thus causing power cylinder 146 to lower wire-clamp releasing lever 140 into engagement with the releasing arm 134 (FIG. 8) to release wire clamp 13.

As cutter arm 94 reaches the bottom of its cutting stroke, a switch-operating lever 212 fixed to cutter-arm pivot shaft 92 (FIG. 7) in back of frame panel 93, engages a limit switch LS-13 (line 6, FIG. 10) closing a circuit to a solenoid SV-2B, which reverses power cylinder 102 for cutter 94 and lifts it up into position for the next cut. Closing of LS-13 also energizes solenoids SV-6B (line 5) and SV-4A (line 7). Solenoid SV-6B shifts solenoid valve SV-6 in the air line to power cylinder 110 so that pressure wheel 104 is raised out of engagement with forming wheel 10 prior to ejection of the newly formed beads. Solenoid SV-4A reverses a solenoid valve SV-4 (FIG. 11) causing cylinder 180 to move ejector plate 152 forward against the rear ends of ejector pins 150 and to push the beads off of the forming wheel.

At the outer limit of the ejecting stroke of plate 152 a switch-operating lever 214 (FIG. 8) at one end of crankshaft 158 closes a limit switch LS-9 (line 8, FIG. 10), completing a circuit to a solenoid SV-4B, which reverses valve SV-4 and cylinder 180 in order to retract ejector plate 152. Another solenoid SV-5A which is energized simultaneously with SV-4B, reverses a valve SV-5 to wire feed cylinder 78, causing the bead wire W to be again fed into clamp 13 on forming wheel 10, which has just been cleared of the beads previously formed.

When wire-feed carriage 72 reaches the end of its feeding stroke, as shown in FIG. 6, it closes a limit switch LS-16 (line 16, FIG. 10) which completes a circuit to a solenoid SV-3A reversing valve SV-3 and cylinder 146 to close wire clamp 13 in order to lock the end of bead wire W to the forming wheel. As wire clamp 13 is locked, a switch-operating lever 216 (FIGS. 2 and 3) at the rear end of shaft 142, on which the releasing lever 140 for clam 13 is mounted, closes a limit switch LS-1 in a circuit to a solenoid SV-5B (line 17), which is energized when both limit switches LS-16 and LS-1 are closed in order to reverse valve SV-5 for cylinder 78 and to retract wire-feed carriage 72. The bead-forming cycle is thus completed with all of the various parts of the machine in position to start a new cycle.

When the machine is to run continuously, contacts SS-2 (line 17a, FIG. 10) are closed, so that when LS-1 closes, the circuit to solenoid SV-1B for disengaging positioning arm 28 is energized. Consequently, the next bead-forming cycle is started immediately and repeated over and over again so long as selector switch SS-2 is on automatic. In order to shut down the machine, it is only necessary to turn selector switch SS-2 to its "end-cycle" or manual position, so that solenoid SV-1B is not energized at the end of the cycle. Since the positioning arm 28 will then remain in its locked position, initiation of a new cycle is prevented, and the machine stops.

A latch relay is provided which has two solenoids LR-A (line 4) and LR-B (line 15), as well as contacts LR-1, LR-2, LR-3, LR-4 and LR-5, at lines 4, 6, 10, 23 and 27, respectively, of FIG. 10. Contacts LR-1 and LR-2 are normally closed and are latched open when solenoid LR-A is energized upon closing of timer cam switch CS-11 (line 4) while CS-5 and CS-6 are open. Each of the other contacts of the latch relay are normally open and are therefore closed when CS-11 closes. Opening of LR-2 ensures that the bead ejector 152 can not operate until the positioning arm 28 is engaged and the wire unlocked from clamp 13 on the forming wheel. By the time CS-7 closes to engage positioning arm 28 as hereinbefore described, LR-3 (line 10) has already been closed so that the circuit to solenoid SV-1A is energized. At the same time, solenoid SV-3B is energized unlocking clamp 13, and solenoid LR-B (line 15) in the latch relay is also energized. This unlatches each of the contacts of the latch relay, including LR-2, so that the circuit for operating the bead ejector is set-up to be energized upon closing of LS-13 at the bottom of the wire cutting stroke. The contacts LR-4 (line 23) and LR-5 (line 27) operate in conjunction with timer cam switches CS-5, CS-6 and CS-11 to prevent the control circuits for the braking mechanism from being energized until CS-5 and CS-6 are closed by the timer in order to slow down the forming wheel. CS-17 is closed at the exact moment for application of mechanical brake 22, in order to stop the forming wheel within the range of the cam on the positioning arm 28. Shortly after CS-17 closes, CS-7 also closes energizing solenoid SV-1A to move positioning arm 28 into locking engagement with the forming wheel. This open LS-10 releasing mechanical brake 22 so that the positioning arm can cam the forming wheel into position. As positioning arm 28 locks the forming wheeling in place, its switch-operating lever 210 closes LS-3 which, in addition to operating the wire cutter, bead ejector and wire feeder as already described, also energizes solenoid LR-B of the latch relay. Therefore, all of the contacts of the latch relay are reset to their original condition so that the control circuits are in condition for the start of the next cycle.

A series of safety switches are provided in the circuit to main drive clutch 26 (line 29) to ensure that the drive clutch is not engaged unless the cutter 94, bead ejector 152 and wire-feed carriage 72 are all retracted so that they do not interfere with rotation of the forming wheel. Thus, limit switch LS-14 is closed only upon engagement by the operating lever 212 (FIG. 7) of wire cutter 94 when the cutter is up; limit switch LS-8 is closed only when engaged by operating lever 214 (FIG. 8) when ejector plate 152 is back; and limit switch LS-15 (FIG. 1) is closed only when engaged by wire-feed carriage 72 in its retracted position. In addition, in order to ensure that bead wire W is locked to the forming wheel, a limit switch LS-2 is closed only while operating lever 216 (FIG. 2) of the wire-clamp releasing lever 140 is not in contact with it. When lever 216 is in this position, releasing lever 140 is lifted out of engagement with the clamp-actuating mechanism. Clamp 13 is therefore locked. With each of these safety switches closed, closing of limit switch LS-4 upon unlocking positioning arm 28 completes the circuit to the drive clutch when the forming cycle is again initiated.

It is sometimes desirable to operate the bead-wire cutter 94 without actuating the wire feed mechanism and other devices on the machine which work automatically when the machine is in operation. A multi-pole, double-throw selector switch SS-3 having contacts at lines 7, 14 and 18 of FIG. 10 is provided so as to open the circuits to the solenoids SV-4A, SV-3B and LR-B. The selector switch SS-2 is then thrown into its "manual" position closing its contacts at line 13 so that when push-button switch PB-1 is actuated solenoid SV-2A is energized for operating the cutter. However, since contacts SS-3 (lines 7 and 14) are now open, nothing else operates. The machine can then be reset to run by turning SS-2 to "automatic" and closing SS-3.

The various pneumatic cylinders for operating the machine are provided with air pressure from a supply manifold 220 (FIG. 11) to which the solenoid valves controlling each cylinder are connected. The valves discharge to an exhaust tank 222. All the power cylinders are double-acting with the exception of cylinder 110 for the pressure wheel 104. In order to increase the speed at which the cylinders operate they may be provided with quick-exhaust valves 224 as indicated.

What is claimed is:
1. Apparatus for winding beads for pneumatic tires comprising,
   (a) a bead-forming wheel having a drive shaft mounted for intermittent rotating about its axis,
   (b) high-speed drive means releasably engageable with said drive shaft for rotating said bead-forming wheel at high speed,
   (c) first clutch means interposed between said bead-forming wheel and said high-speed drive means,
   (d) low-speed drive means releasably engageable with said drive shaft,
   (e) second clutch means interposed between said bead-forming wheel and said low-speed drive means, and
   (f) means for disengaging said first clutch means and for engaging said second clutch means while said forming wheel is rotating at high speed in order to rapidly decelerate said forming wheel,
   (g) said low-speed drive means having means for maintaining its speed at a substantially constant rate.

2. Apparatus as defined in claim 1, which further includes brake means engageable with means rotatable with the drive shaft for said bead-forming wheel for stopping said bead-forming wheel.

3. Apparatus as defined in claim 2, which further includes a positioning member engageable with an element rotatable with the drive shaft for said bead-forming start of its cycle. However, before the forming wheel 10 can be rotated for setting the timer, positioning arm 28 must be disengaged. This is accomplished by throwing a multi-pole double-throw switch on the control panel to its "Wrap Change" position, which closes contacts S1 at line 19 and opens contacts S2, S3 and S5 at line 19, 4 and 12, respectively, in order to deactivate all of the automatic control circuits that normally function when positioning arm 28 is disengaged. Now, by actuating a push-button switch PB–3 (line 19), in a circuit connected directly between feed lines $L_1$ and $L_2$, a solenoid SV–1B (line 18) is energized, reversing power cylinder 35 and withdrawing positioning arm 28 from locking engagement with locking wheel 31 on drive shaft 12, thus releasing forming wheel 10 so that it can be rotated manually to the position at which indicator light E comes on. The positioning arm 28 is then re-engaged by reversing the "Wrap Change" switch, which opens contacts S1 (line 19) and momentarily closes contacts S4 (line 11) in order to energize solenoid SV–1A long enough to reverse cylinder 35, which then draws positioning arm 28 into locking engagement with locking wheel 31.

The bead wire W having been previously fed through guide rollers 82 and locked to feed mechanism 70 with its free end extending through the cutting die-block 98, is cut-off to the right length and then fed to the forming wheel by actuation of a push-button switch PB–1 in the circuit to a solenoid SV–2A (line 12), of a solenoid SV–2 (FIG. 11), which causes the cutter cylinder 102 to operate cutter 94. Prior to this, however, a multi-pole, double-throw switch SS–2 is thrown to a manual-operation position, closing its contacts SS–2 at line 13 so that solenoid SV–2A will be energized when PB–1 is closed. Actuation of PB–1 operates both cutter 94 and the wire-feed mechanism 70 in order to cut the wire, feed it into clamp 13, lock it and retract the wire-feed mechanism 70, all as more fully described hereinafter. Switch SS–2 is then placed in position for automatic operation, opening its contacts at line 13 and closing a set of contacts SS–2 at line 17a of FIG. 10. The machine is now ready to run.

At the start of each bead-forming cycle, the following conditions exist: (1) positioner 28 is engaged; (2) bead wire W is clamped to forming wheel 10; (3) wire feed 70, cutter 94, pressure wheel 104 and bead ejecting plate 152 are all retracted; (4) both the high-speed drive motor 24 and brake motor 20 are running but disengaged from drive shaft 12; (5) switch SS–1 in the supply line to the control circuits is closed; and (6) air pressure is turned on for the various power cylinders. Automatic operation of the machine is initiated by actuation of a starting switch PB–2 (line 18, FIG. 10), which energizes solenoid SV–1B of valve SV–1 in the air supply system to positioning arm cylinder 35, disengaging positioning arm 28 from locking engagement with the roller 34 on the locking wheel 31. Upon disengagement of positioning arm 28, shaft 30 to which arm 28 is fixed is pivoted, causing a switch-operating lever 210 (FIGS. 2 and 5) fixed to the rear end of shaft 30 to swing counterclockwise from the position shown in FIG. 2 into engagement with the actuating arms of three limit switches LS–4, LS–10 and LS–12 mounted on the back panel of frame F. Actuation of these switches by lever 210 closes LS–4 and LS–10 and opens LS–12.

When limit switch LS–4 (line 29, FIG. 10) closes, the control circuit for engaging the main drive clutch 26 is energized, in order to rotate forming wheel 10 at high speed. Actuation of the starting switch PB–2 also completes a circuit to a solenoid SV–6A (line 19) in a valve SV–6 (FIG. 11) exhausting cylinder 110 and lowering pressure roller 104 into engagement with forming wheel 10. The bead is then wound on the forming wheel. As described hereinbefore, the timers each make one revolution for the number of revolutions through which the forming wheel rotates during each bead-forming cycle. About one revolution before the forming wheel is to come to a dead stop, cam switches CS–5 and CS–6 of the timer close, engaging brake clutch 18 and disengaging drive clutch 26.

Closing of CS–5 sets up a circuit (line 25) through a rheostat R1 and a variable resistor O to magnetic clutch 18, so that upon closing of normally open contacts CR–1 (line 24), flywheel 16 is engaged with the main drive shaft 12. Contacts CR–1 close when a control relay CR (line 23) is energized by the closing of cam switch CS–6. At the same time, control relay CR also opens normally-closed contacts CR–2 (line 28) in a circuit through a rheostat R2, which furnishes power to engage main drive clutch 26.

Within about one revolution after decelerating clutch 18 has been engaged, forming wheel 10 has slowed to the speed at which it is driven by the decelerating system 14. Mechanical brake 22 in the main drive can then be safely engaged to stop the forming wheel 10 instantly. Brake 22 is in this instance incorporated in the same Warner "Electro-Pak" unit with magnetic clutch 26, and is actuated upon completion of a control circuit thereto (line 27) when cam switch CS–17 in the timer closes. Simultaneously with actuation of mechanical brake 22, the decelerating system is disengaged by opening of cam switch CS–5 in the timer, thereby de-energizing clutch 18. Application of brake 22 is timed so that forming wheel 10 stops within about a quarter of an inch of the position desired, such that the cam roller 34 on the locking wheel 31 will be engaged by the camming edge 42 on position arm 28 when the latter is moved into locking position.

At about the same time that mechanical brake 22 is applied, cam switch CS–7 (line 11) also closes, completing a circuit to solenoid SV–1A, which actuates the power cylinder 35 in order to move positioning arm 28 back into locking engagement with locking wheel 31. As positioning arm 28 starts into engagement with locking wheel 31, its switch-operating lever 210 moves out of engagement with and reverses limit switches LS–4, LS–10 and LS–12 which: (1) opens the circuit to main drive clutch 26 (line 29, FIG. 10); (2) opens LS–10 (line 27) in the circuit for the mechanical brake 22, thereby releasing brake 22 so that forming wheel 10 is free to be cammed by positioning arm 28; and (3) closes LS–12 (line 12), which is a safety switch to prevent operation of the wire cutter 94 whenever the positioning arm 28 is disengaged. When positioning arm 28 reaches full locking engagement with locking wheel 31, its switch-operating lever 210 engages and closes a limit switch LS–3 (FIG. 2) closing the circuit to solenoid SV–2A (line 12), which actuates the power cylinder 102 for wire cutter 94 so that the wire is cut as soon as forming wheel 10 is locked in place. Closing of LS–3 likewise completes a circuit to a solenoid SV–3B (line 14) of a valve SV–3 (FIG. 11), thus causing power cylinder 146 to lower wire-clamp releasing lever 140 into engagement with the releasing arm 134 (FIG. 8) to release wire clamp 13.

As cutter arm 94 reaches the bottom of its cutting stroke, a switch-operating lever 212 fixed to cutter-arm pivot shaft 92 (FIG. 7) in back of frame panel 93, engages a limit switch LS–13 (line 6, FIG. 10) closing a circuit to a solenoid SV–2B, which reverses power cylinder 102 for cutter 94 and lifts it up into position for the next cut. Closing of LS–13 also energizes solenoids SV–6B (line 5) and SV–4A (line 7). Solenoid SV–6B shifts solenoid valve SV–6 in the air line to power cylinder 110 so that pressure wheel 104 is raised out of engagement with forming wheel 10 prior to ejection of the newly formed beads. Solenoid SV–4A reverses a solenoid valve SV–4 (FIG. 11) causing cylinder 180 to move ejector plate 152 forward against the rear ends of ejector pins 150 and to push the beads off of the forming wheel.

At the outer limit of the ejecting stroke of plate 152 a switch-operating lever 214 (FIG. 8) at one end of crank-shaft 158 closes a limit switch LS–9 (line 8, FIG. 10), completing a circuit to a solenoid SV-4B, which reverses valve SV-4 and cylinder 180 in order to retract ejector plate 152. Another solenoid SV-5A which is energized simultaneously with SV-4B, reverses a valve SV-5 to wire feed cylinder 78, causing the bead wire W to be again fed into clamp 13 on forming wheel 10, which has just been cleared of the beads previously formed.

When wire-feed carriage 72 reaches the end of its feeding stroke, as shown in FIG. 6, it closes a limit switch LS-16 (line 16, FIG. 10) which completes a circuit to a solenoid SV-3A reversing valve SV-3 and cylinder 146 to close wire clamp 13 in order to lock the end of bead wire W to the forming wheel. As wire clamp 13 is locked, a switch-operating lever 216 (FIGS. 2 and 3) at the rear end of shaft 142, on which the releasing lever 140 for clam 13 is mounted, closes a limit switch LS-1 in a circuit to a solenoid SV-5B (line 17), which is energized when both limit switches LS-16 and LS-1 are closed in order to reverse valve SV-5 for cylinder 78 and to retract wire-feed carriage 72. The bead-forming cycle is thus completed with all of the various parts of the machine in position to start a new cycle.

When the machine is to run continuously, contacts SS-2 (line 17a, FIG. 10) are closed, so that when LS-1 closes, the circuit to solenoid SV-1B for disengaging positioning arm 28 is energized. Consequently, the next bead-forming cycle is started immediately and repeated over and over again so long as selector switch SS-2 is on automatic. In order to shut down the machine, it is only necessary to turn selector switch SS-2 to its "end-cycle" or manual position, so that solenoid SV-1B is not energized at the end of the cycle. Since the positioning arm 28 will then remain in its locked position, initiation of a new cycle is prevented, and the machine stops.

A latch relay is provided which has two solenoids LR-A (line 4) and LR-B (line 15), as well as contacts LR-1, LR-2, LR-3, LR-4 and LR-5, at lines 4, 6, 10, 23 and 27, respectively, of FIG. 10. Contacts LR-1 and LR-2 are normally closed and are latched open when solenoid LR-A is energized upon closing of timer cam switch CS-11 (line 4) while CS-5 and CS-6 are open. Each of the other contacts of the latch relay are normally open and are therefore closed when CS-11 closes. Opening of LR-2 ensures that the bead ejector 152 can not operate until the positioning arm 28 is engaged and the wire unlocked from clamp 13 on the forming wheel. By the time CS-7 closes to engage positioning arm 28 as hereinbefore described, LR-3 (line 10) has already been closed so that the circuit to solenoid SV-1A is energized. At the same time, solenoid SV-3B is energized unlocking clamp 13, and solenoid LR-B (line 15) in the latch relay is also energized. This unlatches each of the contacts of the latch relay, including LR-2, so that the circuit for operating the bead ejector is set-up to be energized upon closing of LS-13 at the bottom of the wire cutting stroke. The contacts LR-4 (line 23) and LR-5 (line 27) operate in conjunction with timer cam switches CS-5, CS-6 and CS-11 to prevent the control circuits for the braking mechanism from being energized until CS-5 and CS-6 are closed by the timer in order to slow down the forming wheel. CS-17 is closed at the exact moment for application of mechanical brake 22, in order to stop the forming wheel within the range of the cam on the positioning arm 28. Shortly after CS-17 closes, CS-7 also closes energizing solenoid SV-1A to move positioning arm 28 into locking engagement with the forming wheel. This open LS-10 releasing mechanical brake 22 so that the positioning arm can cam the forming wheel into position. As positioning arm 28 locks the forming wheeling in place, its switch-operating lever 210 closes LS-3 which, in addition to operating the wire cutter, bead ejector and wire feeder as already described, also energizes solenoid LR-B of the latch relay. Therefore, all of the contacts of the latch relay are reset to their original condition so that the control circuits are in condition for the start of the next cycle.

A series of safety switches are provided in the circuit to main drive clutch 26 (line 29) to ensure that the drive clutch is not engaged unless the cutter 94, bead ejector 152 and wire-feed carriage 72 are all retracted so that they do not interfere with rotation of the forming wheel. Thus, limit switch LS-14 is closed only upon engagement by the operating lever 212 (FIG. 7) of wire cutter 94 when the cutter is up; limit switch LS-8 is closed only when engaged by operating lever 214 (FIG. 8) when ejector plate 152 is back; and limit switch LS-15 (FIG. 1) is closed only when engaged by wire-feed carriage 72 in its retracted position. In addition, in order to ensure that bead wire W is locked to the forming wheel, a limit switch LS-2 is closed only while operating lever 216 (FIG. 2) of the wire-clamp releasing lever 140 is not in contact with it. When lever 216 is in this position, releasing lever 140 is lifted out of engagement with the clamp-actuating mechanism. Clamp 13 is therefore locked. With each of these safety switches closed, closing of limit switch LS-4 upon unlocking positioning arm 28 completes the circuit to the drive clutch when the forming cycle is again initiated.

It is sometimes desirable to operate the bead-wire cutter 94 without actuating the wire feed mechanism and other devices on the machine which work automatically when the machine is in operation. A multi-pole, double-throw selector switch SS-3 having contacts at lines 7, 14 and 18 of FIG. 10 is provided so as to open the circuits to the solenoids SV-4A, SV-3B and LR-B. The selector switch SS-2 is then thrown into its "manual" position closing its contacts at line 13 so that when push-button switch PB-1 is actuated solenoid SV-2A is energized for operating the cutter. However, since contacts SS-3 (lines 7 and 14) are now open, nothing else operates. The machine can then be reset to run by turning SS-2 to "automatic" and closing SS-3.

The various pneumatic cylinders for operating the machine are provided with air pressure from a supply manifold 220 (FIG. 11) to which the solenoid valves controlling each cylinder are connected. The valves discharge to an exhaust tank 222. All the power cylinders are double-acting with the exception of cylinder 110 for the pressure wheel 104. In order to increase the speed at which the cylinders operate they may be provided with quick-exhaust valves 224 as indicated.

What is claimed is:
1. Apparatus for winding beads for pneumatic tires comprising,
  (a) a bead-forming wheel having a drive shaft mounted for intermittent rotating about its axis,
  (b) high-speed drive means releasably engageable with said drive shaft for rotating said bead-forming wheel at high speed,
  (c) first clutch means interposed between said bead-forming wheel and said high-speed drive means,
  (d) low-speed drive means releasably engageable with said drive shaft,
  (e) second clutch means interposed between said bead-forming wheel and said low-speed drive means, and
  (f) means for disengaging said first clutch means and for engaging said second clutch means while said forming wheel is rotating at high speed in order to rapidly decelerate said forming wheel,
  (g) said low-speed drive means having means for maintaining its speed at a substantially constant rate.

2. Apparatus as defined in claim 1, which further includes brake means engageable with means rotatable with the drive shaft for said bead-forming wheel for stopping said bead-forming wheel.

3. Apparatus as defined in claim 2, which further includes a positioning member engageable with an element rotatable with the drive shaft for said bead-forming wheel for accurately indexing said bead-forming wheel after it is stopped.

4. Apparatus as defined in claim 3, which further includes timing means for sequencing the operation of said first and second clutch means, said brake means and said positioning member, in order to rapidly stop and accurately index said bead-forming wheel.

5. Apparatus as defined in claim 2, wherein said first and second clutch means are electromagnetic clutches and said brake means comprises a mechanical brake included as an integral part of at least one of said electromagnetic clutches.

6. Apparatus as defined in claim 3, in which said element is a locking wheel mounted on said drive shaft for rotation with said bead-forming wheel, said positioning member comprising an arm pivotally mounted for movement into and out of camming engagement with said locking wheel.

7. Apparatus as defined in claim 6, wherein said locking wheel is provided with a roller adjacent its periphery, said positioning arm having a locking notch for receiving said roller and locking said bead-forming wheel against rotation, one side of said notch being disposed for camming engagement with said roller, in order to cam said roller into said locking notch when said bead-forming wheel is stopped by said brake means.

8. Apparatus for winding beads for pneumatic tires comprising,
(a) a bead-forming wheel having a drive shaft mounted for intermittent rotation about its axis,
(b) means for controlling the bead-forming operation carried out in winding beads on said wheel,
(c) a plurality of cam-operated timing devices for sequencing the bead-forming operations,
(d) means interconnecting said drive shaft and said timing devices for driving said timing devices simultaneously with said bead-forming wheel,
(e) each of said timing devices being driven at a different speed ratio with respect to said bead-forming wheel according to the number of wraps in the bead to be wound, and
(f) switch means for connecting any one of said timing devices with said control means and for isolating the others therefrom.

9. Apparatus as defined in claim 8, wherein said control means comprises a plurality of solenoid-operated valve means and said timing devices each comprise a series of cam-operated switches in electrical circuits with said solenoids such that said solenoids are energized in a predetermined sequence by the selected timing device.

References Cited
UNITED STATES PATENTS

| | | | |
|---|---|---|---|
| 2,083,350 | 6/1957 | Shook | 156—422 |
| 3,128,956 | 4/1964 | Schumann | 242—9 |
| 3,289,955 | 12/1966 | McBroom et al. | 242—9 |

FRANK J. COHEN, *Primary Examiner.*

B. S. TAYLOR, *Assistant Examiner.*